United States Patent [19]

Carr et al.

[11] Patent Number: 5,317,395

[45] Date of Patent: May 31, 1994

[54] FOCAL PLANE ARRAY DUAL PROCESSING SYSTEM AND TECHNIQUE

[75] Inventors: Todd R. Carr, Alexandria; Brian J. Kowalewski, Fredericksburg, both of Va.

[73] Assignee: The United States of America as represented by the Secretary of the Army, Washington, D.C.

[21] Appl. No.: 40,193

[22] Filed: Mar. 31, 1993

[51] Int. Cl.$^5$ ................................................. H04N 5/33
[52] U.S. Cl. ..................................................... 348/164
[58] Field of Search ................. 358/113; 382/9, 17, 382/19, 27, 38; 359/117

[56] References Cited

U.S. PATENT DOCUMENTS

| | | |
|---|---|---|
| 3,798,366 | 3/1974 | Hunt et al. ............................ 358/113 |
| 4,903,309 | 2/1990 | Wentworth et al. ................ 358/113 |
| 4,991,020 | 2/1991 | Zwirn ..................................... 358/113 |
| 5,077,609 | 12/1991 | Manelphe ............................. 358/113 |

Primary Examiner—Tommy P. Chin
Assistant Examiner—Emil Lenchak
Attorney, Agent, or Firm—Alain L. Bashore; Milton W. Lee; Anthony T. Lane

[57] ABSTRACT

A focal plane array dual processing system and technique utilizes a single focal plane array to provide scene imagery and temporal processing of a sub-region of the scene. Resultant data from a row by column focal plane array detector elements is processed for imaging and image processing by an image processor. A smaller data subset from a row by column subset of the focal plane array with resultant spatial data subset is temporally processed by a temporal processor. The data and data subset which is multiplexed, digitized and formatted as raster-formatted raw data vector format is addressed for image and temporal processing by a data buffer integrator.

2 Claims, 3 Drawing Sheets

FOCAL PLANE ARRAY DUAL PROCESSING SYSTEM AND TECHNIQUE

BACKGROUND OF INVENTION

1. Field of the Invention

The present invention generally relates to focal plane array processing systems and techniques and more specifically, to an infrared focal plane array dual processing system and technique capable of simultaneous temporal and image processing from a single infrared focal plane array.

2. Description of Related Prior Art

Infrared imaging devices operate at a specific wavelength region, spatial resolution and frequency response determined by such major factors as the spectral, spatial, and temporal response of the detector. An infrared focal plane array is the surface upon which radiation will impinge upon to be detected by the device. Detector elements may be integral with the array to convert the radiation to electrical signals. By use of signal processing incorporated into the electronics of the infrared imaging device, there can be achieved the enhancement or reduction of features in the produced output.

Two types of generalized processing capabilities of an infrared focal plane array detector are image and temporal processing. Image processing includes not only imaging (display) but also intelligent processes such as pattern recognition. Temporal processing is implemented for such purposes as spectral estimation. Sampling frequencies for the two types of processing generally require different frequencies because of the nature of the signature of interest. Image processing generally requires a sampling frequency equal to a video rate, typically 30 hertz. A temporal sampling frequency, is usually greater than the imaging sampling frequency since information gained from the temporal domain require a larger data sample. In the prior art, separate systems are required for implementation of both processing capabilities.

Currently, two systems are required in order to provide thermal imagery of a scene as well as temporal processing of selected areas in the scene. One of the systems is an imaging system, typically a scanned forward-looking infrared (FLIR) system. The complimentary system is a co-boresighted, non-imaging infrared (IR) device which temporally processes subareas of the field of view of the imaging FLIR. Both systems require front-end optics, detector cooling apparatus and a great deal of common electronics. Disadvantages arise from the use of the above prior art devices. Typically, two distinct co-boresighted systems are mounted on a host platform that is subject to vibration. The ability to economically provide line-of-sight motion compensation and maintain boresight between two distinct systems is compromised in practice by jitter introduced by vibrating host platforms. The temporal processing system is extremely sensitive to jitter induced by the host platform. Jitter rejection by the temporal processing system is crucial to achieving high temporal processing performance, known as temporal signal fidelity. Expensive and complicated stabilization schemes are generally required to attenuate jitter and maintain boresight since the use of elastomer damping to achieve vibration isolation does not allow the boresight tolerances required in a high performance system.

While the prior art has reported using separate imaging and temporal processing systems and technique, none have established a basic for a specific apparatus that is dedicated to the task of resolving the particular problem at hand.

What is needed in this instance is a dual processing system and technique utilizing a single focal plane array such that there is substantially no temporal signal fidelity degradation when operated.

SUMMARY OF THE INVENTION

It is therefore the primary object of the invention to provide a dual processing system and technique utilizing a single focal plane array such that there is also no substantial degradation of temporal signal fidelity.

According to the invention, the dual capability of imaging and temporal processing is integrated into a single sensor. Digitized samples of an entire focal plane array is used for image processing while a user defined subset is processed by a temporal processing. The data from the array is used to generate imagery as well as a spectral estimation of a sub-region of interest of the scene. The spectral output of the temporal processor will be compared to a known target library in a block of decision logic for potential identification of objects of interest contained within the sub-region of the scene.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT

Figure 1:
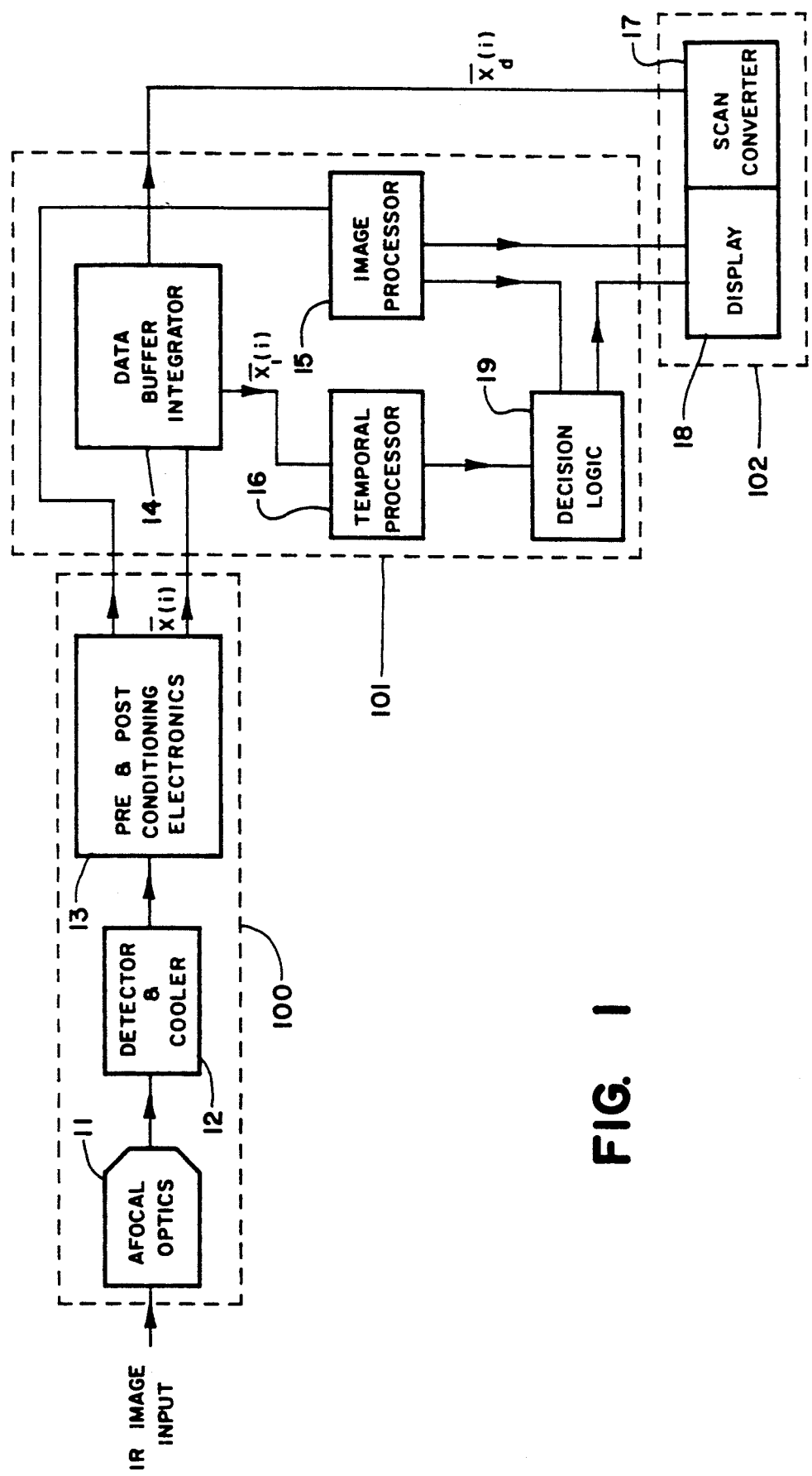
FIG. 1 is a block diagram of the overall system.

Referring now to the drawings, and more particularly to FIG. 1, there is shown an overall block diagram of the components of a focal plane array dual processing system and technique included within a receiver 100, processor 101 and output 102. Infrared energy from a scene is collected by afocal optics 11 and focused on a cryogenically-cooled two dimensional infrared focal plane array unit 12 which is part of a staring FLIR system which provides imaging and temporal analysis of scene objects. In the preferred embodiment a standard IR afocal/optics design would be utilized as afocal optics 11, which would be optimized (such as the entrance apperature and focal length) for use with the intended application. A detector array within unit 12 is sampled at a constant frame rate Fs with digitized samples (or pixels) of the entire focal plane array and a subset thereof utilized as described in conjunction with FIG. 2.

Figure 2:
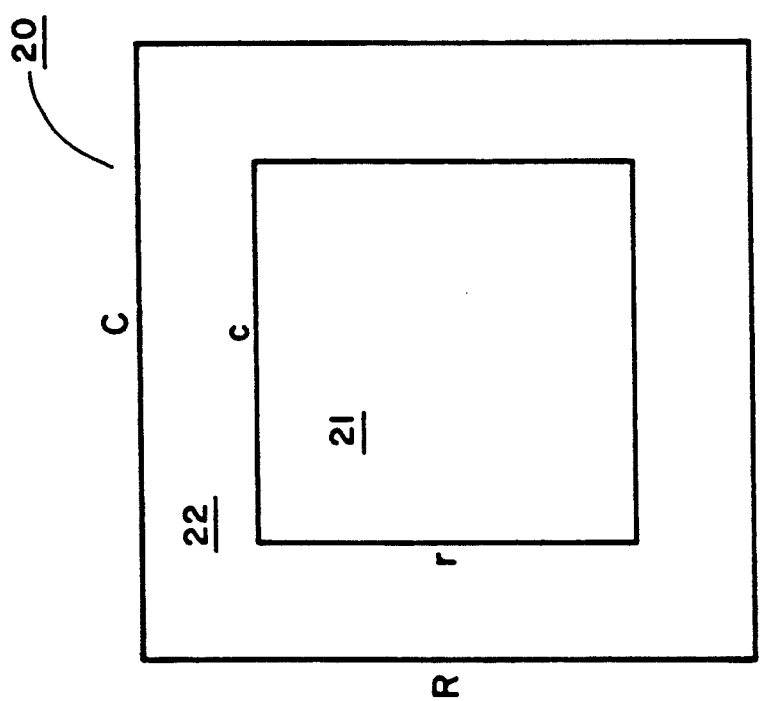
FIG. 2 is a focal plane array pattern utilized.

FIG. 2 shows a focal plane array 20 as an R-row by C-column focal plane array utilized as a composite detector. Focal plane array 20 contains a user defined r-row by c-column subset of detector elements shown as region 21 which corresponds to the field of interest which is sent to temporal processor 16 of FIG. 1. Region 22 which also includes region 21, is utilized to provide imaging as well as temporal information and both regions are sampled at the same frame rate, $F_s$, which is not the same as the conventional video frame rate, $F_v$. Frame rate $F_s$ is chosen appropriately by Nyquist criteria, known in the art, to be greater than twice the bandwidth of the anticipated lowpass temporal signal of interest hypothesized to be contained in the sensor's field of view. This requires temporal reconstruction of signals in region 21 to drive the sampling rate requirements for focal plane array 20.

Detector elements of array 20 are read out, with the resulting sampled analog data multiplexed and subsequently amplified, conditioned and digitized in pre and post conditioning electronics 13 of FIG. 1. The subsequent digitized data is also processed in pre and post conditioning electronics 13 to ensure scene pixels are lexicographically ordered in a raster format so that there is as output raster-formatted raw data vector. The conditioning involves the use of signal amplification and formatting the data, or pixels, in desired row and column format. In the preferred embodiment, standard components including pre- and post- amplifiers coupled with A/D converters is utilized. The raster-formatted raw data vector is taken from the i'th frame, designated X(i), which is the output from pre & post electronics 13. The index i is the time index on a sequence of frames with normalized time indices . . . , i-1,i,i+1,i+2, . . . , which are obtained at the sampling rate Fs. As shown in FIG. 1, processor 101 accepts the raster-formatted raw data vector in two separate paths, one of which is image processor 15, and the other data buffer integrator 14 of which its operation will next be described.

Figure 3:
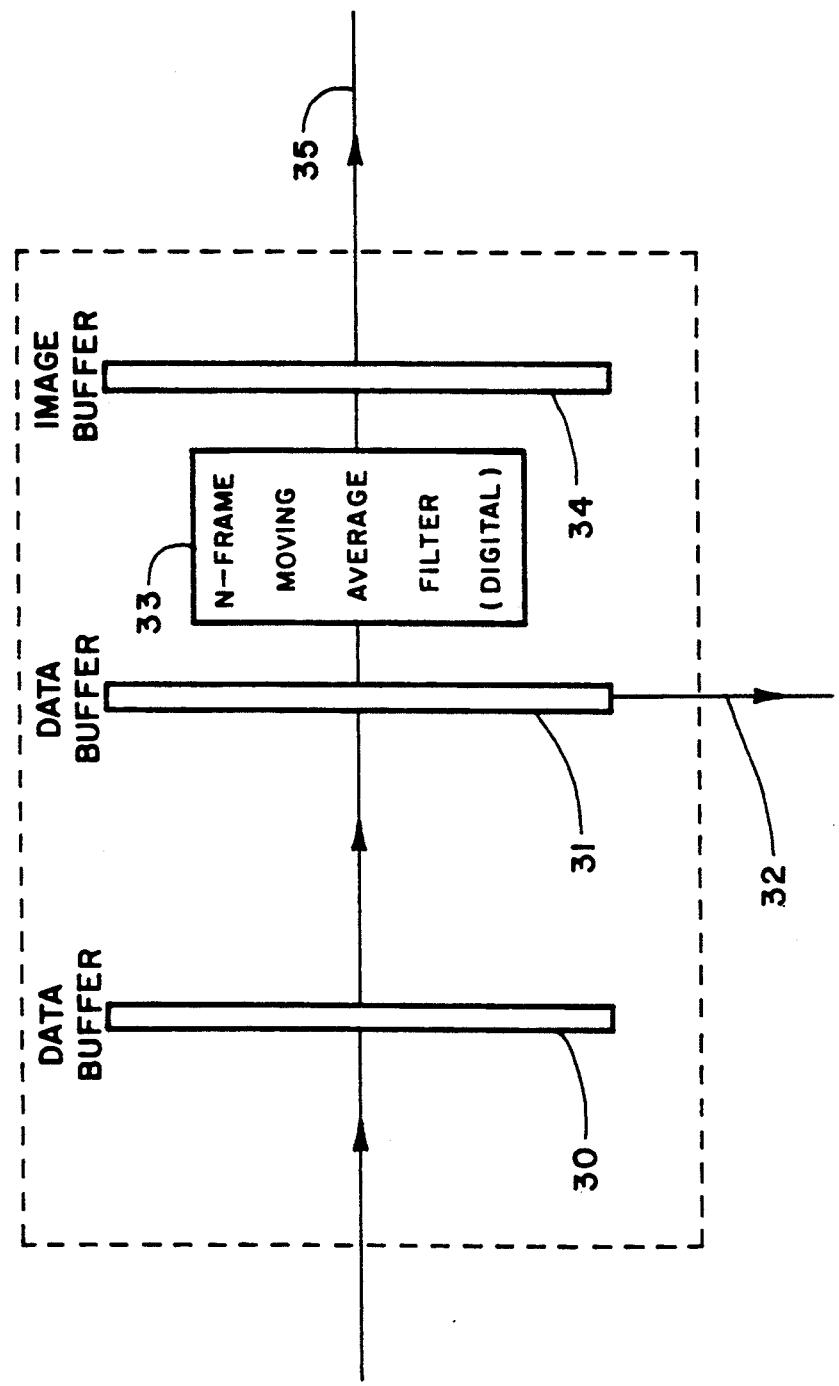
FIG. 3 is a block diagram of the method utilized by the data buffer integrator.

FIG. 3 depicts the block diagram for data buffer integrator 14 of FIG. 1, where raw data vector X(i) is double buffered. Raw data vector X(i) fills data buffer 30 until full, after which its contents are duplicated into middle buffer 31. Data buffer 30 now fills with X(i+1) data and data buffer 31 contains X(i) data. A spatial subset of the X(i) data, designated Xt(i), and shown as output 32, is addressed by and transferred to temporal processor 16 of FIG. 1. Data from data buffer 31 is processed by N-frame, digital moving average filter 33 and stored in image (video) buffer 34. N is selected in order to downconvert the sampling rate from master rate Fs to a display-defined video frame rate Fv. A standard programmable data buffer/integrator board such as VME is utilized as the preferred embodiment. Filter 33 smooths the image data, providing temporal noise reduction. Output 35 from buffer 34 is data from buffer 34 which is sent to scan converter 17 of FIG. 1 to be described later.

Temporal processor 16 of FIG. 1, which in the preferred embodiment is Texas Instruments TI 320C40 based, provides power spectrum estimation of a time series of those pixels located in a user defined region of interest. A time series of appropriate duration is built from the storage of a multiplicity of consecutive temporal data vectors, $X_t(i)$. The duration of the time series is a function of the employed temporal processing technique, which for the preferred embodiment is a fast fouier transform, and the required spectral resolution of the power spectrum estimate. It is understood that the invention is limited to the specific temporal processing technique of the preferred embodiment but may be any appropriate technique for the desired results obtained. The temporal processing is performed on the time history of individual or grouped pixels, such as superpixels, in the user defined region of interest. The region of interest defines the region of pixels to be processed by temporal processor 16.

Scan converter 17 of FIG. 1 receives output 35 of FIG. 3 as an image buffer data vector $X_d(i)$ consisting of N averaged frames that are then converted into an appropriate display format by scan converter 17. Outputs from temporal processor 16 and image processor 15 are combined in decision logic 19, which a Texas Instruments TI 320C40 based. The output from decision logic output 19 consists of status information, such as location, identification, rate of motion, etc, of objects in a scene. The spectral information derived from temporal processor 16 of scene objects located in the user defined area can be compared with library entries of known objects in order to enhance object identification. The status information is integrated into video along with the image buffer data for display on display 18. In an alternative embodiment, control information can be passed from temporal processor 16 and image processor 15 to a tracker (not shown) in order to enhance tracking of scene objects, such as those with modulating amplitudes. The function of the image processor is to provide general spatial processing, such as filtering, tracking or pattern recognition, on the raw data vector, X(i), according to the mission need. An Intel 860 based image processor is utilized in the preferred embodiment.

In the preferred embodiment, focal plane array 30 is a 128×128 or 256×256 Platinum Silicide array prototypes available from Texas Instruments Incorporated and Hughs Aircraft Corporation. Detector elements 31 correspond to the field of regard of a weapons system fire control track box. The sampling frequency for detector elements 31 is selected by taking into consideration the spectral nature of the signal of interest, the sample 'read' time and the rise time of the detector elements. While this invention has been described in terms of the preferred embodiment consisting of a weapons system fire control, those skilled in the art will recognize that the invention can be practiced with modification within the spirit and scope of the appended claims.

Having thus described my invention, what we claim as new and desire to secure by Letters Patent is as follows:

1. A focal plane array dual processing system in a staring FLIR device wherein infrared energy is collected by afocal optics and focused onto a cryogenically cooled detector array wherein said focal plane array dual processing system is comprised of:

a focal plane array with row by column detector elements for which resultant sampled data is utilized for imaging and image processing and a smaller row by column subset of said larger row by column detector element which resultant spatial subset is utilized for temporal processing;

conditioning electronics which accepts said resultant sampled data to multiplex, amplify, digitize and lexicographically order in a raster format an output raster-formatted raw data vector;

a data buffer integrator which double buffers said raw data vector for processing in an output means, and addresses the spatial subset of the raw data vector for temporal processing;

a temporal processor which processes the spatial subset of the raw data vector to provide a power spectrum estimation of a time series of pixels represented by the spatial subset;

an image processor which processes the doubled buffered raw data vector at a predetermined frame rate;

output means which processes the output of the temporal and image processor for simultaneously generating imagery of the overall scene as well as the power spectrum estimation of a sub-region of interest of the scene.

2. A focal plane array dual processing technique for dual image and temporal processing comprising the steps of:

collecting sampled data from a row by column detector elements of a focal plane array utilized for imaging and image processing and a subset of the sampled data corresponding to a smaller row by column detector element as a spatial subset for temporal processing;

conditioning said sampled data to multiplex, amplify, digitize and lexicographically order in a raster format to output a raster-formatted raw data vector format;

data buffer integrating said raw data vector which is subsequently processed in an output means, and simultaneously addressing the spatial subset of the raw data vector for temporal processing;

temporal processing the spatial subset of the raw data vector to provide a power spectrum estimation of a time series of pixels represented by the spatial subset;

image processing the buffered raw data vector at a frame rate for output processing; and displaying the output of the temporal and image processing for generating imagery of the scene and the power spectrum estimation of a sub-region of interest of the scene.

* * * * *